(12) United States Patent
Noda et al.

(10) Patent No.: US 8,686,078 B2
(45) Date of Patent: Apr. 1, 2014

(54) RUBBER COMPOSITION AND FUEL TANK PACKING FOR AUTOMOBILE USING THE COMPOSITION

(75) Inventors: Masashi Noda, Konan (JP); Eiji Matsunaga, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 111 days.

(21) Appl. No.: 13/191,942

(22) Filed: Jul. 27, 2011

(65) Prior Publication Data

US 2012/0053279 A1 Mar. 1, 2012

(30) Foreign Application Priority Data

Aug. 26, 2010 (JP) ................................. 2010-189479

(51) Int. Cl.
*C08K 3/30* (2006.01)

(52) U.S. Cl.
USPC ............ 524/423; 524/544; 526/247; 526/255

(58) Field of Classification Search
USPC .................... 524/423, 544; 526/247, 255
See application file for complete search history.

(56) References Cited

U.S. PATENT DOCUMENTS

| | | | | |
|---|---|---|---|---|
| 5,374,484 A | * | 12/1994 | Kasahara et al. | 428/421 |
| 6,607,705 B2 | * | 8/2003 | Pinnavaia et al. | 423/328.2 |
| 7,138,470 B2 | * | 11/2006 | Fukushi et al. | 526/255 |
| 7,148,300 B2 | * | 12/2006 | Fukushi et al. | 526/247 |
| 2007/0045967 A1 | * | 3/2007 | Park | 277/534 |
| 2010/0210745 A1 | * | 8/2010 | McDaniel et al. | 521/55 |
| 2012/0095150 A1 | * | 4/2012 | Ota et al. | 524/495 |

FOREIGN PATENT DOCUMENTS

| | | | |
|---|---|---|---|
| JP | 06-157686 | * | 6/1994 |
| JP | 6-157686 A | | 6/1994 |
| JP | 2008-195906 | * | 8/2008 |

* cited by examiner

*Primary Examiner* — Peter D. Mulcahy
*Assistant Examiner* — Henry Hu
(74) *Attorney, Agent, or Firm* — Westerman, Hattori, Daniels & Adrian, LLP

(57) ABSTRACT

Provided is a rubber composition, which is excellent in fuel permeation resistance, and is capable of achieving improvements in low-temperature embrittlement property and solvent crack property. The rubber composition includes: a fluororubber having a fluorine concentration content of 70 to 71 wt % as a main component; a crosslink-type agent; and the following components (A) and (B), in which: the total content [(A)+(B)] of the above-mentioned components (A) and (B) falls within the range of 17 to 25 parts by weight with respect to 100 parts by weight of the above-mentioned fluororubber; and a weight ratio (A)/(B) of the content of the above-mentioned component (A) to the content of the above-mentioned component (B) falls within the range of 2.0/1 to 3.0/1: (A) barium sulfate; and (B) a neutral silica.

7 Claims, 1 Drawing Sheet

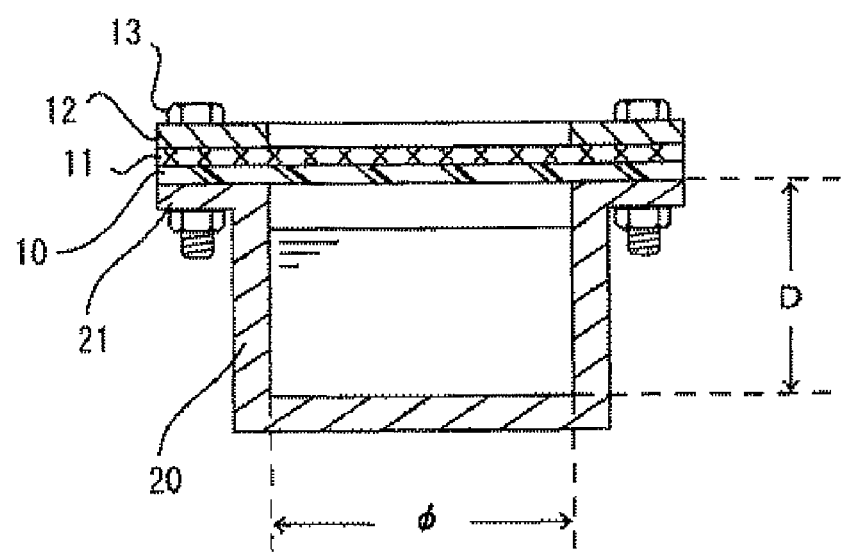

RUBBER COMPOSITION AND FUEL TANK PACKING FOR AUTOMOBILE USING THE COMPOSITION

BACKGROUND OF THE INVENTION

1. Field of the Invention

The present invention relates to a rubber composition and a fuel tank packing for an automobile using the composition, and more specifically, to a rubber composition to be used in, for example, a fuel tank packing for an automobile and a fuel tank packing for an automobile using the composition.

2. Description of the Related Art

A fuel tank packing (rubber packing) has been used between a fuel pump and a tank, which are assembled for supplying a fuel to an engine for an automobile, for sealing the fuel pump and the tank. For example, a fluororubber (FKM) material having a fluorine concentration content of about 66 wt % is often used in a fuel tank packing corresponding to a partial-credit zero emission vehicle (P-ZEV) regulation in North America. In recent years, however, the development of a fuel tank packing having a reduced fuel permeation amount has been requested in view of environmental problems, and even the use of the above-mentioned fluororubber having a fluorine concentration content of about 66 wt % cannot correspond to the requested characteristic. In view of the foregoing, for example, a fluorine-containing elastomer composition using a high-fluorine concentration content fluororubber has been proposed for solving the problem (see Japanese Patent Application Laid-open No. Hei 6-157686).

SUMMARY OF THE INVENTION

The above-mentioned fluorine-containing elastomer composition described in Japanese Patent Application Laid-open No. Hei 6-157686 has an effect on fuel permeation resistance (fuel barrier property) because the composition uses the high-fluorine concentration content fluororubber. However, the composition has the following drawback. The composition is poor in low-temperature embrittlement property and solvent crack property (crack extension property), and improvements in both of these properties cannot be achieved.

The present invention has been made in view of such circumstances, and an object of the present invention is to provide a rubber composition, which is excellent in fuel permeation resistance, and is capable of achieving improvements in low-temperature embrittlement property and solvent crack property, and a fuel tank packing for an automobile using the composition.

In order to achieve the above-mentioned object, a first gist of the present invention resides in a rubber composition including: a fluororubber having a fluorine concentration content of 70 to 71 wt % as a main component; a crosslink-type agent; and the following components (A) and (B), in which: the total content [(A)+(B)] of the above-mentioned components (A) and (B) falls within the range of 17 to 25 parts by weight with respect to 100 parts by weight of the above-mentioned fluororubber; and a weight ratio (A)/(B) of the content of the above-mentioned component (A) to the content of the above-mentioned component (B) falls within the range of 2.0/1 to 3.0/1:

(A) barium sulfate; and
(B) a neutral silica.

Further, a second gist of the present invention resides in a fuel tank packing for an automobile, which is obtained by vulcanizing the above-mentioned rubber composition.

That is, the inventors of the present invention have made extensive studies for obtaining a rubber composition, which is excellent in fuel permeation resistance, and is capable of achieving improvements in low-temperature embrittlement property and solvent crack property (crack extension property). In the process of the studies, the inventors have pinned down the following fact. When barium sulfate generally used as a filler is used in a large amount, dispersibility between a fluororubber and barium sulfate is poor, and hence rubber physical properties decrease. In addition, barium sulfate is apt to serve as an origin for cracks at low temperatures or as an origin for rupture at the time of immersion in a fuel, and hence improvements in low-temperature embrittlement property and solvent crack property cannot be achieved. In view of the foregoing, for solving the problem, the inventors of the present invention have paid attention to a combination of a high-fluorine concentration fluororubber, barium sulfate [component (A)], and a neutral silica [component (B)], and have conducted an experiment on a proper content of each component. As a result, the inventors have found that a desired object can be achieved with the following rubber composition. The rubber composition is mainly formed of a high-fluorine concentration fluororubber having a fluorine concentration content of 70 to 71 wt % and contains barium sulfate [component (A)], a neutral silica [component (B)], and a crosslink-type agent, the total content [(A)+(B)] of the above-mentioned components (A) and (B) falls within the range of 17 to 25 parts by weight with respect to 100 parts by weight of the above-mentioned fluororubber, and a weight ratio (A)/(B) of the content of the above-mentioned component (A) to the content of the above-mentioned component (B) falls within the range of 2.0/1 to 3.0/1. Thus, the inventors have reached the present invention.

As described above, the rubber composition of the present invention is such that the high-fluorine concentration fluororubber having a fluorine concentration content of 70 to 71 wt %, barium sulfate [component (A)], and the neutral silica [component (B)] are combined, and each component is used at a proper content. The rubber composition of the present invention has good uniform dispersibility with the above-mentioned high-fluorine concentration fluororubber because a predetermined amount of the neutral silica [component (B)] is blended into the composition. As a result, the numbers of sources for cracks at low temperatures and of origins for rupture at the time of immersion in a fuel decrease significantly, and hence improvements in low-temperature embrittlement property and solvent crack property can be achieved. In addition, the use of the neutral silica [component (B)] as described above can suppress the occurrence of crosslinking inhibition or crosslinking excess, enables proper adjustment of a crosslink density, and can suppress stress concentration. In addition, the use of the fluororubber having a fluorine concentration content of 70 to 71 wt % improves the fuel permeation resistance.

In addition, when an organic peroxide [component (C)] and an isocyanurate compound [component (D)] are used in combination as the above-mentioned crosslink-type agent so that the content or the like of each component may be properly adjusted, the crosslink density can be additionally optimized, and the low-temperature embrittlement property and the solvent crack property are additionally improved.

It should be noted that the term "crosslink-type agent" as used herein is not limited to vulcanizing agents (crosslinking agents) in a narrow sense and refers to crosslink-type agents in a broad sense including, for example, a crosslinking auxiliary.

BRIEF DESCRIPTION OF THE DRAWINGS

FIG. 1 is an explanatory diagram illustrating a method for evaluation for fuel permeation resistance (cup method).

DETAILED DESCRIPTION OF THE INVENTION

Next, an embodiment of the present invention is described in detail, provided that the present invention is not limited to the embodiment.

A rubber composition of the present invention can be obtained by using a fluororubber having a fluorine concentration content of 70 to 71 wt %, barium sulfate (component A), and a neutral silica (component B). In the present invention, the total content (A+B) of the components A and B is adjusted to fall within the range of 17 to 25 parts by weight with respect to 100 parts by weight of the above-mentioned specific fluororubber, and a weight ratio A/B of the content of the above-mentioned component A to the content of the above-mentioned component B is adjusted to fall within the range of 2.0/1 to 3.0/1. The foregoing is the main feature of the present invention.

It should be noted that a state in which the rubber composition of the present invention contains the fluororubber as a main component means that the fluororubber accounts for more than a half of the rubber composition.

Next, those components are described.

<<Specific Fluororubber>>

A fluororubber having a fluorine concentration content (which may hereinafter be simply referred to as a "fluorine concentration") of 70 to 71 wt % is used as the above-mentioned specific fluororubber, and a fluororubber having a fluorine concentration of 71 wt % is preferred. This is because of the following reasons. That is, when the fluorine concentration is excessively low, the fuel permeation resistance of the rubber composition deteriorates. In contrast, when the fluorine concentration is excessively high, the characteristics of the fluororubber as a resin become more significant than the characteristics of the fluororubber as a rubber, and hence the permanent compression set property of the composition deteriorates to affect its sealing performance.

The above-mentioned specific fluororubber preferably crosslinks with an organic peroxide (component C), and examples of such fluororubber include a vinylidene fluoride-propylene hexafluoride copolymer, a vinylidene fluoride-propylene hexafluoride-ethylene tetrafluoride copolymer, an ethylene tetrafluoride-perfluorovinylether copolymer, and a vinylidene fluoride-ethylene tetrafluoride-perfluoroalkylvinylether copolymer. Those fluororubbers are each used alone, or two or more kinds thereof are used in combination. Of those, a tertiary fluororubber is preferred in terms of fuel permeation resistance, and the vinylidene fluoride-propylene hexafluoride-ethylene tetrafluoride copolymer is particularly preferred because of its excellent fuel permeation resistance.

<<Barium Sulfate (Component A)>>

Examples of barium sulfate (component A) include a pulverized product of a barite mineral called natural heavy spar (barite powder) and sedimentary barium sulfate produced by a chemical reaction, and the products can be used alone or in combination. Sedimentary barium sulfate is preferred because the sizes of its particles can be controlled depending on conditions at the time of its synthesis and hence extremely fine barium sulfate can be produced. It should be noted that surface-treated barium sulfate whose surface is treated with $SiO_2$—$Al_2O_3$ or the like can be used without a problem.

The average particle diameter of barium sulfate (component A) described above falls within the range of preferably 0.01 to 50 μm, particularly preferably 0.1 to 20 μm. In addition, the specific surface area of barium sulfate (component A) described above falls within the range of preferably 0.1 to 150 $m^2/g$, particularly preferably 1 to 100 $m^2/g$. Further, the oil absorption of barium sulfate (component A) described above falls within the range of preferably 1 to 50 ml/100 g, particularly preferably 5 to 25 ml/100 g.

<<Neutral Silica (Component B)>>

A silica except an acidic silica and a basic silica is used as the neutral silica (component B). A neutral silica having a pH of 5.0 to 9.0 is preferred, and a neutral silica having a pH of 5.5 to 8.5 is particularly preferred. It should be noted that the pH of the above-mentioned silica can be measured, for example, as described below. That is, first, a sample (silica) is collected in a beaker, distilled water is added to the beaker, and the mixture is stirred with a mixer so as to be a uniform suspension. Next, a numerical value on a pH meter is read while the stirring is performed at such a low speed that the uniform suspended state can be maintained. Thus, the pH of the silica can be measured.

Examples of the above-mentioned neutral silica (component B) include dry white carbon, wet white carbon, a colloidal silica, and a sedimented silica. Those products are each used alone, or two or more kinds thereof are used in combination. Of those, wet white carbon mainly formed of water-containing silicic acid is particularly preferred.

In addition, the specific surface area of the above-mentioned neutral silica (component B) falls within the range of typically 30 to 350 $m^2/g$, preferably 50 to 280 $m^2/g$, more preferably 60 to 260 $m^2/g$ in terms of a nitrogen adsorption specific surface area (BET method). It should be noted that the nitrogen adsorption specific surface area based on the BET method described above can be measured in conformity with ASTM D 3037-81.

In the present invention, the total content [(A)+(B)] of barium sulfate (component A) and the neutral silica (component B) described above falls within the range of 17 to 25 parts by weight, preferably 18.5 to 23.5 parts by weight, particularly preferably 20 to 22 parts by weight with respect to 100 parts by weight of the above-mentioned specific fluororubber because of the following reasons. That is, when the total content [(A)+(B)] is excessively small, the rubber composition has low hardness, and is poor in solvent crack property and robustness. In contrast, when the total content [(A)+(B)] is excessively large, the composition has high hardness, and is poor in solvent crack property.

In addition, in the present invention, a weight ratio [(A)/(B)] of the content (A) of barium sulfate (component A) described above to the content (B) of the above-mentioned neutral silica (component B) falls within the range of 2.0/1 to 3.0/1, preferably 2.15/1 to 2.85/1, particularly preferably 2.3/1 to 2.7/1 because of the following reasons. That is, when the weight ratio [(A)/(B)] is excessively low, the addition amount of the neutral silica (component B) is so large that the dispersibility of barium sulfate (component A) deteriorates, the hardness of the rubber composition is high, and the solvent crack property and robustness of the composition reduce. In contrast, when the weight ratio [(A)/(B)] is excessively high, the addition amount of the neutral silica (component B) is so small that the dispersibility of barium sulfate (component A) deteriorates, the hardness of the composition is low, and the low-temperature embrittlement property and solvent crack property of the composition are poor.

The respective contents of barium sulfate (component A) and the neutral silica (component B) described above in the present invention must satisfy the above-mentioned relationships, i.e., the total content [(A)+(B)] and the weight ratio

[(A)/(B)]. Specifically, the content of barium sulfate (component A) described above falls within the range of 10 to 20 parts by weight, preferably 12 to 18 parts by weight, particularly preferably 14 to 16 parts by weight with respect to 100 parts by weight of the above-mentioned specific fluororubber. In addition, the content of the above-mentioned neutral silica (component B) falls within the range of 5 to 7 parts by weight, preferably 5.5 to 6.5 parts by weight, particularly preferably 5.75 to 6.25 parts by weight with respect to 100 parts by weight of the above-mentioned specific fluororubber. It should be noted that in the present invention, the content (A) of barium sulfate (component A) is preferably larger than the content (B) of the neutral silica (component B) in terms of robustness.

<<Crosslink-Type Agent>>

As described in the foregoing, the crosslink-type agent to be used in the present invention is not limited to vulcanizing agents (crosslinking agents) in a narrow sense, and means crosslink-type agents in a broad sense including, for example, a crosslinking auxiliary. Specifically, the organic peroxide (component C) as a crosslinking agent and an isocyanurate compound (component D) as a crosslinking auxiliary are preferably used in combination.

<<Organic Peroxide (Component C)>>

Examples of the organic peroxide (component C) include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, and n-butyl-4,4-bis(t-butylperoxy)valerate; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-di(t-butylperoxy)hexane, and 2,5-dimethyl-2,5-bis(t-butylperoxy)hexine-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-trioyl peroxide; peroxyesters such as t-butylperoxy acetate, t-butylperoxy isobutyrate, t-butylperoxy-2-ethylhexanoate, t-butylperoxy laurate, t-butylperoxy benzoate, di-t-butylperoxy isophthalate, 2,5-dimethyl-2,5-di(benzolyperoxy)hexane, t-butylperoxymaleic acid, t-butylperoxy isopropylcarbonate, and cumylperoxyoctate; and hydroperoxides such as t-butyl hydroperoxide, cumene hydroperoxide, diisopropylbenzene hydroperoxide, 2,5-dimethylhexane-2,5-dihydroperoxide, and 1,1,3,3,-tetramethylbutyl peroxide. Those organic peroxides are each used alone, or two or more kinds thereof are used in combination. Of those, dialkyl peroxides are suitably used in terms of good workability such as storage stability.

<<Isocyanurate Compound (Component D)>>

The isocyanurate compound (component D) is used as a crosslinking auxiliary. For example, the isocyanurate compound is exemplified by triallyl isocyanurate (TRIC), trimethallyl isocyanurate (TMAIC), and the like. Those isocyanurate compounds are each used alone, or two or more kinds thereof are used in combination.

In the present invention, the total content [(B)+(C)+(D)] of the neutral silica (component B), the organic peroxide (component C), and the isocyanurate compound (component D) falls within the range of preferably 10 to 14 parts by weight, particularly preferably 11 to 13 parts by weight with respect to 100 parts by weight of the above-mentioned specific fluororubber because of the following reason. That is, when the total content [(B)+(C)+(D)] is excessively small, tendencies that the dispersibility is poor, and the hardness, brittle temperature, and solvent crack property of the rubber composition deteriorate are observed.

In addition, in the present invention, a weight ratio [(B)/(C)+(D)] of the content (B) of the above-mentioned neutral silica (component B) to the total content [(C)+(D)] of the organic peroxide (component C) and the isocyanurate compound (component D) falls within the range of preferably 0.9/1 to 1.5/1, particularly preferably 1.0/1 to 1.4/1 because of the following reason. That is, when the weight ratio [(B)/(C)+(D)] deviates from the above-mentioned range, the dispersibility tends to be poor, and the brittle temperature and the solvent crack property tend to deteriorate.

Further, in the present invention, a weight ratio [(C)/(D)] of the content (C) of the above-mentioned organic peroxide (component C) to the content (D) of the above-mentioned isocyanurate compound (component D) falls within the range of preferably 1.8/1 to 2.0/1, particularly preferably 1.85/1 to 1.95/1 because of the following reason. That is, when the weight ratio [(C)/(D)] deviates from the above-mentioned range, crosslinking tends to become excessive and sluggish, and the brittle temperature and the solvent crack property tend to become difficult to improve.

It should be noted that the organic peroxide (component C) and the isocyanurate compound (component D) as well as the specific fluororubber, barium sulfate (component A), and the neutral silica (component B) can be blended into the rubber composition of the present invention, and carbon black, a plasticizer, a processing aid, a scorch retarder, a colorant, or the like can be blended as required without a problem.

The rubber composition of the present invention can be obtained, for example, by: blending the specific fluororubber, barium sulfate (component A), and the neutral silica (component B), and as required, the organic peroxide (component C), the isocyanurate compound (component D), and the like; and kneading the mixture with, for example, an open roll, a Banbury mixer, or a kneader.

A fuel tank packing for an automobile of the present invention can be obtained by subjecting the rubber composition of the present invention prepared in the foregoing to, for example, injection molding, compression molding, or casting, and vulcanizing the resultant under a predetermined condition.

EXAMPLES

Next, examples are described together with comparative examples, provided that the present invention is not limited to these examples.

First, the following materials were prepared prior to the examples and the comparative examples.

<High-Fluorine Concentration Fluororubber (for Use in Examples)>

Vinylidene fluoride-propylene hexafluoride-ethylene tetrafluoride copolymer (DAI-EL G902, manufactured by DAIKIN INDUSTRIES, LTD., fluorine concentration content: 71 wt %)

<High-Fluorine Concentration Fluororubber (for Use in Examples)>

Vinylidene fluoride-propylene hexafluoride-ethylene tetrafluoride copolymer (VITON GF200S, manufactured by DuPont Performance Elastomers, fluorine concentration content: 70 wt %)

<Low-Fluorine Concentration Fluororubber (for Use in Comparative Examples)>
Vinylidene fluoride-propylene hexafluoride copolymer (VITON GAL200S, manufactured by DuPont Performance Elastomers, fluorine concentration content: 66 wt %)
<Barium Sulfate (Component A)>
Sedimentary barium sulfate 100, manufactured by Sakai Chemical Industry Co., Ltd.
<Neutral Silica (Component B)>
Nipsil ER, manufactured by TOSOH SILICA CORPORATION (pH: 7.0 to 8.5)
<Organic Peroxide (Component C)>
2,5-dimethyl-2,5-di(t-butylperoxy)hexane (PERHEXA 25B-40, manufactured by NOF CORPORATION)
<Isocyanurate Compound (Component D)>
Triallyl isocyanurate (TRIC, manufactured by Nippon Kasei Chemical Company Limited)
<Inorganic Pigment (Ferric Oxide)>
BENGARA MR-120, manufactured by MORISHITA BENGARA KOGYO CO., LTD.

Examples 1 to 7 and Comparative Examples 1 to 5

The respective components shown in Tables 1 and 2 below were blended at ratios shown in the tables, and were then kneaded with a roll. Thus, rubber compositions were prepared.

The rubber compositions of the examples and the comparative examples thus obtained were evaluated for the respective characteristics in accordance with the following criteria. Tables 1 and 2 above show those results as well.

TABLE 1

| | Example (Part(s) by weight) | | | | | | |
|---|---|---|---|---|---|---|---|
| | 1 | 2 | 3 | 4 | 5 | 6 | 7 |
| DAI-EL G902 | 100 | 100 | 100 | 100 | 100 | 100 | — |
| VITON GF200S | — | — | — | — | — | — | 100 |
| VITON GAL200S | — | — | — | — | — | — | — |
| Barium sulfate (A) | 15 | 15 | 12.1 | 17.9 | 14 | 15.7 | 15 |
| Neutral silica (B) | 6 | 6 | 4.9 | 7.1 | 7 | 5.3 | 6 |
| Inorganic pigment | 5 | 5 | 5 | 5 | 5 | 5 | 5 |
| Organic peroxide (C) | 2 | 3.75 | 3.75 | 3.75 | 3.75 | 3.75 | 3.75 |
| Isocyanurate compound (D) | 0.9 | 2 | 2 | 2 | 2 | 2 | 2 |
| A + B | 21 | 21 | 17 | 25 | 21 | 21 | 21 |
| A/B | 2.5 | 2.5 | 2.5 | 2.5 | 2.0 | 3.0 | 2.5 |
| B + C + D | 8.9 | 11.8 | 10.7 | 12.9 | 12.8 | 11.1 | 11.8 |
| B/(C + D) | 2.1 | 1.0 | 0.9 | 1.2 | 1.2 | 0.9 | 1.0 |
| C/D | 2.2 | 1.9 | 1.9 | 1.9 | 1.9 | 1.9 | 1.9 |
| Hardness | 71 | 71 | 68 | 74 | 74 | 68 | 71 |
| | ○ | ○ | ○ | ○ | ○ | ○ | ○ |
| Brittle temperature (° C.) | −31 | −36 | −34 | −33 | −31 | −32 | −37 |
| | ○ | ○○ | ○ | ○ | ○ | ○ | ○○ |
| Solvent crack property (second(s)) | 42 | 48 | 40 | 36 | 47 | 36 | 48 |
| | ○ | ○○ | ○ | ○ | ○○ | ○ | ○○ |
| Robustness | ○ | ○ | ○ | ○ | ○ | ○○ | ○ |
| Fuel permeation resistance (mg · mm/cm²/day) | 0.7 | 0.6 | 0.9 | 0.8 | 0.9 | 0.7 | 0.9 |
| | ○ | ○ | ○ | ○ | ○ | ○ | ○ |

TABLE 2

| | Comparative Example (Part(s) by weight) | | | | |
|---|---|---|---|---|---|
| | 1 | 2 | 3 | 4 | 5 |
| DAI-EL G902 | 100 | 100 | 100 | 100 | — |
| VITON GAL200S | — | — | — | — | 100 |
| Barium sulfate (A) | 10 | 21 | 18 | 12 | 15 |
| Neutral silica (B) | 4 | 9 | 3 | 9 | 6 |
| Inorganic pigment | 5 | 5 | 5 | 5 | 5 |
| Organic peroxide (C) | 3.75 | 3.75 | 3.75 | 3.75 | 3.75 |
| Isocyanurate compound (D) | 2 | 2 | 2 | 2 | 2 |
| A + B | 14 | 30 | 21 | 21 | 21 |
| A/B | 2.5 | 2.3 | 6.0 | 1.3 | 2.5 |
| B + C + D | 9.8 | 14.8 | 8.8 | 14.8 | 11.8 |
| B/(C + D) | 0.7 | 1.6 | 0.5 | 1.6 | 1.0 |
| C/D | 1.9 | 1.9 | 1.9 | 1.9 | 1.9 |
| Hardness | 60 | 83 | 64 | 81 | 70 |
| | x | x | Δ | x | ○ |
| Brittle temperature (° C.) | −30 | −34 | −25 | −38 | −38 |
| | ○ | ○ | x | ○○ | ○○ |
| Solvent crack property (second(s)) | 26 | 24 | 18 | 28 | 50 |
| | x | x | x | x | ○○ |
| Robustness | x | ○ | ○ | x | ○ |
| Fuel permeation resistance (mg · mm/cm²/day) | 0.7 | 0.6 | 0.7 | 0.7 | 2 |
| | ○ | ○ | ○ | ○ | x |

[Hardness]
Each rubber composition was subjected to press vulcanization at 170° C. for 15 minutes. Thus, a vulcanized rubber sheet having a thickness of 2 mm was produced. Next, hardness measurement was performed with a JIS 5 dumbbell in conformity with JIS K 6251.
<Evaluation>
○: 65 to 75
Δ: More than 60 and less than 65, or more than 75 and less than 81
x: 60 or less, or 81 or more

[Brittle Temperature (Low-Temperature Embrittlement Property)]

The brittle temperature (° C.) of each rubber composition was measured in conformity with JIS K 6261.

<Evaluation>

∘∘: Less than −35° C.

∘: −35° C. or more and −30° C. or less x: More than −30° C.

[Solvent Crack Property (Crack Extension Property)]

Each rubber composition was subjected to press vulcanization at 170° C. for 15 minutes. Thus, a vulcanized rubber sheet having a thickness of 2 mm was produced. Next, a notch flaw was provided for the center of a JIS 1 dumbbell cut out of the vulcanized rubber sheet, and the dumbbell was elongated by 50%. Then, the dumbbell was immersed as it was in Fuel C (10% of ethanol) at 40° C., and a time (seconds) required for the dumbbell to divide was measured.

<Evaluation>

∘∘: More than 45 seconds

∘: 30 seconds to 45 seconds x: Less than 30 seconds

[Robustness]

Each rubber composition was subjected to press vulcanization at 170° C. for 15 minutes. Thus, a vulcanized rubber sheet having a thickness of 2 mm was produced. Next, the measurement of a tensile elongation at break (%) was performed N times (where N represents 10) with a JIS 5 dumbbell in conformity with JIS K 6251, and the standard deviation of the measured values was derived.

<Evaluation>

∘∘: The standard deviation is smaller than 20.

∘: The standard deviation is 20 to 25.

x: The standard deviation is more than 25.

[Fuel Permeation Resistance (Cup Method)]

First, each rubber composition was subjected to press vulcanization at 170° C. for 15 minutes. Thus, a vulcanized rubber sheet (sample sheet) having a thickness of 0.5 mm was produced. Then, the sample sheet was evaluated for its fuel permeation resistance (cup method) as described below. That is, as illustrated in FIG. 1, an SUS cup 20 (inner diameter φ: 66 mm, height D in the cup: 40 mm) with a flange was prepared, and 100 cc of FUEL C (containing 50 wt % of toluene and 50 wt % of isooctane) were charged as a test fuel into the cup. Next, the above-mentioned sample sheet (sample) 10 was mounted on the flange portion 21 of the above-mentioned SUS cup 20. Further, the sheet was held with a packing 12 through a gauze 11 (16 mesh) and fixed with bolts 13. The resultant thus assembled was turned upside down and loaded into an oven at 40° C. Then, the weight of the cup was measured every day, and its reduction amount (permeation amount Q) was calculated. A permeation coefficient (mg·mm/cm²·day) was calculated on the basis of the value in accordance with the following equation (1).

<Evaluation>

∘: 1.0 or less x: More than 1.0

[Math. 1]

$$\text{Permeation coefficient (mg·mm/cm}^2\cdot\text{day)} = \frac{Q \times t}{A \times d} \quad (1)$$

[In the formula, Q represents a permeation amount (mg), t represents the thickness (mm) of the sample, A represents the area (cm²) of contact between the sample and the test fuel, and d represents the number (day) of test days.]

As can be seen from the results of Tables 1 and 2 above, each of the products of the examples had proper hardness, and was excellent in low-temperature embrittlement property, solvent crack property, robustness, and fuel permeation resistance.

In contrast, the product of Comparative Example 1 had low hardness, and was poor in solvent crack property and robustness because the total content [(A)+(B)] of barium sulfate (component A) and the neutral silica (component B) was excessively small. The product of Comparative Example 2 had high hardness, and was poor in solvent crack property because the total content [(A)+(B)] was excessively large. The product of Comparative Example 3 in which the weight ratio [(A)/(B)] of the content (A) of barium sulfate (component A) to the content (B) of the neutral silica (component B) was excessively high had bad dispersibility, and was poor in low-temperature embrittlement property and solvent crack property. The product of Comparative Example 4 in which the weight ratio [(A)/(B)] was excessively low had bad dispersibility, and its solvent crack property and robustness decreased. The product of Comparative Example 5 was poor in fuel permeation resistance because a fluororubber having a low fluorine concentration content was used.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

The rubber composition of the present invention, which is preferably used in a fuel tank packing for an automobile, can be used in, for example, seal parts such as various O-rings of fuel systems for automobiles as well.

What is claimed is:

1. A rubber composition, comprising:
    a fluororubber having a fluorine content of 70 to 71 wt % as a main component;
    a crosslinking agent; and
    the following components (A) and (B), wherein:
        a total content [(A)+(B)] of the component (A) and the component (B) falls within a range of 17 to 25 parts by weight with respect to 100 parts by weight of the fluororubber; and
        a weight ratio (A)/(B) of a content of the component (A) to a content of the component (B) falls within a range of 2.0/1 to 3.0/1:
            (A) barium sulfate; and
            (B) a neutral silica having a pH of 5.0 to 9.0.

2. A rubber composition according to claim 1, wherein:
    the crosslinking agent comprises the following components (C) and (D);
    a total content [(B)+(C)+(D)] of the component (B), the component (C), and the component (D) falls within a range of 10 to 14 parts by weight with respect to 100 parts by weight of the fluororubber;
    a weight ratio [(B)/((C)+(D))] of the content of the component (B) to a total content [(C)+(D)] of the component (C) and the component (D) falls within a range of 0.9/1 to 1.5/1; and
    a weight ratio (C)/(D) of a content of the component (C) to a content of the component (D) falls within a range of 1.8/1 to 2.0/1:
        (C) an organic peroxide; and
        (D) an isocyanurate compound.

3. A rubber composition according to claim 1, which is a vulcanized composition.

4. A rubber composition according to claim 2, which is a vulcanized composition.

5. A rubber composition according to claim 1, wherein the neutral silica (B) has a pH of 5.5 to 8.5.

6. A rubber composition according to claim 1,
   wherein a specific surface area of the neutral silica (B) falls within a range of 30 to 350 m$^2$/g in conformity with ASTM D 3037-81.

7. A rubber composition according to claim 1, wherein the barium sulfate (A) has the following properties (I) to (III):
   (I) an average particle diameter of 0.01 to 50 μm;
   (II) a specific surface area of 0.1 to 150 m$^2$/g; and
   (III) an oil absorption of 1 to 50 ml/100 g.

* * * * *